US012700978B2

(12) United States Patent
Abdelghaffar et al.

(10) Patent No.: US 12,700,978 B2
(45) Date of Patent: Aug. 4, 2026

(54) DOPPLER SHIFT COMPENSATION

(71) Applicant: QUALCOMM Incorporated, San Diego, CA (US)

(72) Inventors: Muhammad Sayed Khairy Abdelghaffar, San Jose, CA (US); Yu Zhang, San Diego, CA (US); Runxin Wang, San Diego, CA (US); Alexandros Manolakos, Escondido, CA (US)

(73) Assignee: QUALCOMM Incorporated, San Diego, CA (US)

( * ) Notice: Subject to any disclaimer, the term of this patent is extended or adjusted under 35 U.S.C. 154(b) by 743 days.

(21) Appl. No.: 17/997,979

(22) PCT Filed: Jun. 22, 2020

(86) PCT No.: PCT/CN2020/097359
§ 371 (c)(1),
(2) Date: Nov. 4, 2022

(87) PCT Pub. No.: WO2021/258241
PCT Pub. Date: Dec. 30, 2021

(65) Prior Publication Data
US 2023/0163928 A1 May 25, 2023

(51) Int. Cl.
*H04L 5/00* (2006.01)

(52) U.S. Cl.
CPC .......... *H04L 5/0091* (2013.01); *H04L 5/0023* (2013.01); *H04L 5/0048* (2013.01)

(58) Field of Classification Search
CPC ... H04L 5/0091; H04L 5/0023; H04L 5/0048; H04L 5/0035; H04L 2027/0026; H04L 5/0094; H04L 27/0014; H04L 5/0051
See application file for complete search history.

(56) References Cited

U.S. PATENT DOCUMENTS

| | | | |
|---|---|---|---|
| 2018/0206132 A1 | 7/2018 | Guo et al. | |
| 2019/0260532 A1 | 8/2019 | Manolakos et al. | |

(Continued)

FOREIGN PATENT DOCUMENTS

| | | | |
|---|---|---|---|
| CN | 102957461 A | | 3/2013 |
| CN | 103428138 A | * | 12/2013 |

(Continued)

OTHER PUBLICATIONS

Samsung, "Summary of email discussion for Rel. 17 enhancements on MIMO for NR", 3GPP TSG RAN Meeting #86, Dec. 9-12, 2019, (Year: 2019).*

(Continued)

*Primary Examiner* — Brian J. Gillis

(74) *Attorney, Agent, or Firm* — Harrity & Harrity LLP/Qualcomm Incorporated

(57) ABSTRACT

Various aspects of the present disclosure generally relate to wireless communication. In some aspects, a user equipment may receive, based at least in part on transmitting information indicating a UE capability for uplink frequency shift configuration, quasi-co-location (QCL) information associated with an uplink transmission control indicator (TCI) state; determine an uplink frequency shift configuration for a sounding reference signal (SRS) based at least in part on the QCL information associated with the uplink TCI state; and transmit the SRS based at least in part on the uplink frequency shift configuration. Numerous other aspects are provided.

35 Claims, 9 Drawing Sheets

600 —▶

605
UE capability information

610
SRS resource set information
(spatial relationship information)

620
Transmit SRS(s)

UE
120

615
Determine uplink
Doppler shift
compensation
configuration

BS(s)
110

(56) References Cited

U.S. PATENT DOCUMENTS

| | | | |
|---|---|---|---|
| 2020/0107314 A1 | 4/2020 | Zhou et al. | |
| 2020/0119875 A1 | 4/2020 | John Wilson et al. | |
| 2020/0145983 A1 | 5/2020 | Levitsky et al. | |
| 2022/0400456 A1* | 12/2022 | Kakishima | H04L 27/261 |

FOREIGN PATENT DOCUMENTS

| | | | | | |
|---|---|---|---|---|---|
| CN | 102957461 | B | * | 6/2015 | |
| CN | 110034897 | A | | 7/2019 | |
| CN | 110149187 | A | * | 8/2019 | H04L 5/0048 |
| CN | 110839290 | A | | 2/2020 | |
| WO | 2020028792 | A1 | | 2/2020 | |

OTHER PUBLICATIONS

Huawei, et al., "Remaining Details of QCL Assumptions", 3GPP Draft, 3GPP TSG RAN WG1 Meeting #91, R1-1719443, 3rd Generation Partnership Project (3GPP), Mobile Competence Centre, 650, Route Des Lucioles, F-06921 Sophia-Antipolis Cedex, France, vol. RAN WG1, No. Reno, USA, Nov. 27-Dec. 1, 2017, 6 Pages, Nov. 17, 2017 (Nov. 17, 2017), XP051369144, p. 2-p. 4, table 1, Dec. 1, 2017, 6 Pages, the whole document.
International Search Report and Written Opinion—PCT/CN2020/097359—ISA/EPO—Mar. 24, 2021.

Samsung: "Summary of Email Discussion for Rel. 17 Enhancements on MIMO for NR", 3GPP TSG RAN Meeting #86, RP-192435, Sitges, Spain, Dec. 9-12, 2019, 31 Pages.
CMCC: "Motivation for High-Speed Train Enhancement in Rel-17 NR MIMO", 3GPP TSG RAN Meeting #86, RP-192729, 3rd Generation Partnership Project Gpp), Mobile Competence Centre, 650, Route Des Lucioles, F-06921 Sophia-antipolis Cedex, France, vol. TSG RAN, No. Sitges, Spain, Dec. 9-Dec. 12, 2019, Dec. 2, 2019, 8 Pages, XP051834334, The Whole Document.
CMCC: "Motivation for NR Enhancement for High Speed Train Scenario", 3GPP TSG RAN Meeting #84, RP-191208, 3rd Generation Partnership Project, Mobile Competence Centre, 650, Route Des Lucioles, F-06921, Sophia-Antipolis Cedex, France, vol. TSG RAN, No. Newport Beach, USA, Jun. 3-Jun. 6, 2019, Jun. 2, 2019, XP051747418, 4 pages.
Samsung: "Summary of Email Discussion for Rel. 17 Enhancements on MIMO for NR", 3GPP TSG RAN Meeting #86, RP-192435, 3rd Generation Partnership Project, Mobile Competence Centre, 650, Route Des Lucioles, F-06921, Sophia-Antipolis Cedex, France, vol. TSG RAN, No. Sitges, Spain, Dec. 9-Dec, 12, 2019, Dec. 3, 2019, XP051835464, 31 Pages, pp. 6-7, CMCC views.
Supplementary European Search Report—EP20941745—Search Authority—The Hague—Feb. 21, 2024.
ZTE: "Preliminary Views on Further Enhancement for NR MIMO", 3GPP TSG RAN WG1 Meeting #101-e, R1-2003483, 3rd Generation Partnership Project, Mobile Competence Centre, 650, Route Des Lucioles, F-06921 Sophia-Antipolis Cedex, France, vol. RAN WG1, e-Meeting, May 25-Jun. 5, 2020, 19 Pages, May 16, 2020, XP051885267.

* cited by examiner

650

No Doppler Shift

SRS → QCL Type-A/B/C → TRS1

660

Single Doppler Shift

SRS → QCL Type-E → TRS1

670

Multiple Doppler Shift

SRS → QCL Type-E → TRS1
SRS → QCL Type-E → TRS2

680

Multiple Doppler Shift

SRS1 → QCL Type-E → TRS1
SRS2 → QCL Type-E → TRS2

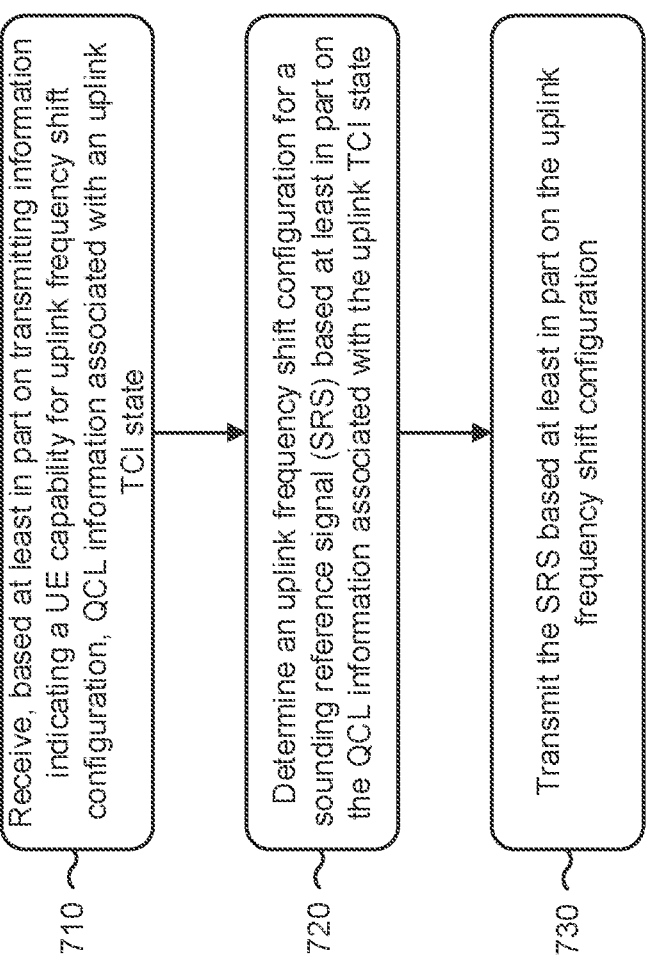

710 — Receive, based at least in part on transmitting information indicating a UE capability for uplink frequency shift configuration, QCL information associated with an uplink TCI state 720 — Determine an uplink frequency shift configuration for a sounding reference signal (SRS) based at least in part on the QCL information associated with the uplink TCI state 730 — Transmit the SRS based at least in part on the uplink frequency shift configuration

DOPPLER SHIFT COMPENSATION

CROSS-REFERENCE TO RELATED APPLICATION

This Patent Application is a 371 National Stage of Patent Cooperation Treaty (PCT) Patent Application No. PCT/CN2020/097359, filed on Jun. 22, 2020, entitled "DOPPLER SHIFT COMPENSATION," and assigned to the assignee hereof. The disclosure of the prior Application is considered part of and is incorporated by reference into this Patent Application.

FIELD OF THE DISCLOSURE

Aspects of the present disclosure generally relate to wireless communication and to techniques and apparatuses for Doppler shift compensation.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY in some aspects, a method of wireless communication, performed by a user equipment, may include receiving, based at least in part on transmitting information indicating a UE capability for uplink frequency shift configuration, quasi-co-location (QCL) information associated with an uplink transmission control indicator (TCI) state; determining an uplink frequency shift configuration for a sounding reference signal (SRS) based at least in part on the QCL information associated with the uplink TCI state; and transmitting the SRS based at least in part on the uplink frequency shift configuration.

In some aspects, a UE for wireless communication may include a memory and one or more processors operatively coupled to the memory. The memory and the one or more processors may be configured to receive, based at least in part on transmitting information indicating a UE capability for uplink frequency shift configuration, QCL information associated with an uplink TCI state; determine an uplink frequency shift configuration for an SRS based at least in part on the QCL information associated with the uplink TCI state; and transmit the SRS based at least in part on the uplink frequency shift configuration.

In some aspects, a non-transitory computer-readable medium may store one or more instructions for wireless communication. The one or more instructions, when executed by one or more processors of a UE, may cause the one or more processors to receive, based at least in part on transmitting information indicating a UE capability for uplink frequency shift configuration, QCL information associated with an uplink TCI state; determine an uplink frequency shift configuration for an SRS based at least in part on the QCL information associated with the uplink TCI state; and transmit the SRS based at least in part on the uplink frequency shift configuration.

In some aspects, an apparatus for wireless communication may include means for receiving, based at least in part on transmitting information indicating a capability for uplink frequency shift configuration, QCL information associated with an uplink TCI state; means for determining an uplink frequency shift configuration for an SRS based at least in part on the QCL information associated with the uplink TCI state; and means for transmitting the SRS based at least in part on the uplink frequency shift configuration.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIG. 7 is a diagram illustrating an example process associated with Doppler shift compensation, in accordance with various aspects of the present disclosure.

DETAILED DESCRIPTION

Figure 1:
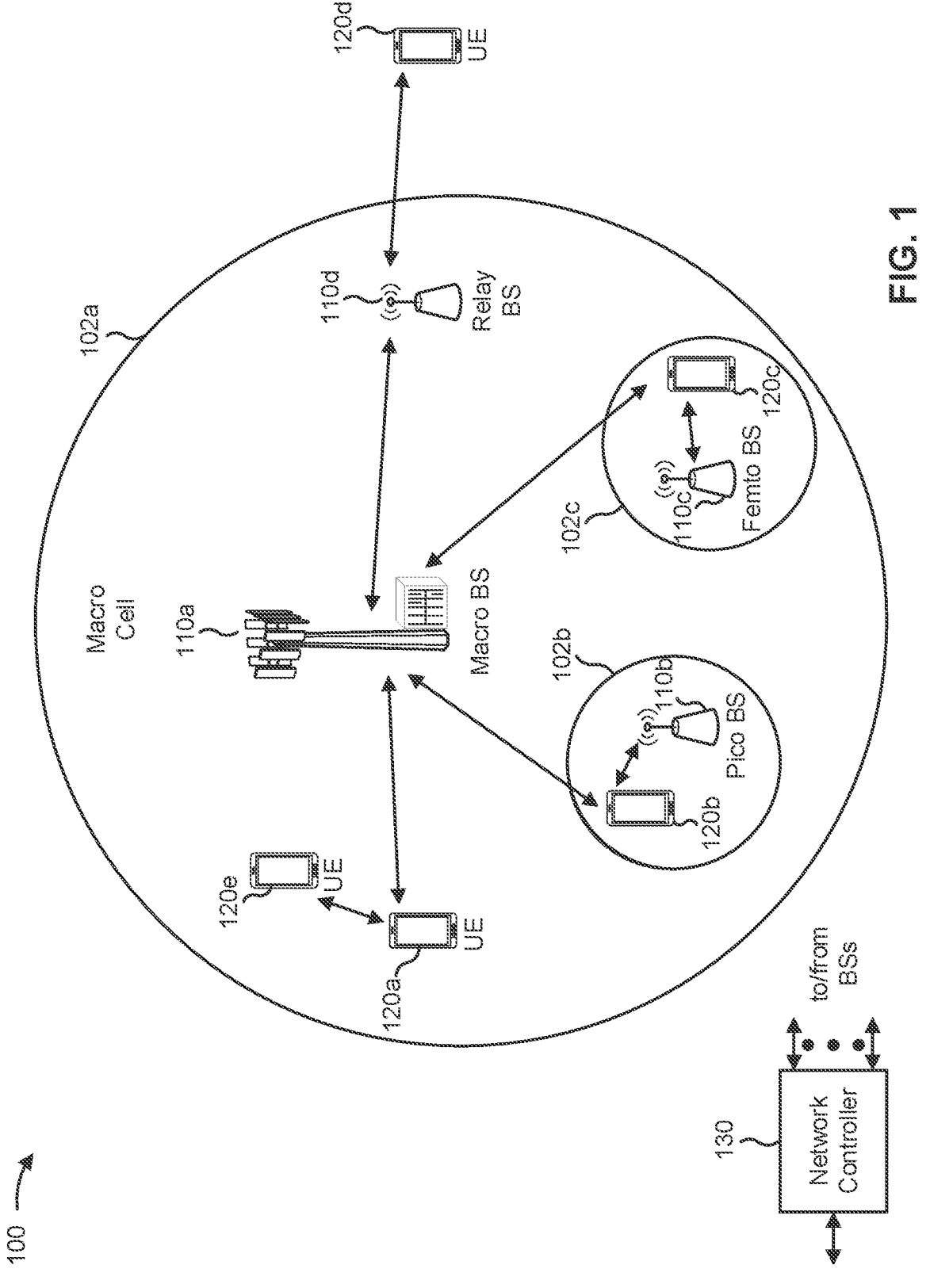
FIG. 1 is a diagram illustrating an example of a wireless network, in accordance with various aspects of the present disclosure.

In some communications systems, such as multi-transmit receive point (TRP) deployments, a user equipment (UE) may operate in a mobility state. For example, in high-speed-train (HST) single frequency network (SFN) deployments, UEs or other wireless devices may connect to a network via one or more TRPs while moving a speeds greater than a threshold. As a result, communications with the UEs or other wireless devices may be subject to a Doppler shift. A UE may use a quasi-co-location (QCL) relationship to facilitate channel estimation, frequency offset estimation, synchronization, and/or the like. For example, when the UE determines that a first antenna port has a QCL relationship with a second antenna port, the UE may apply parameters determined for the first antenna port to the second antenna port. This may reduce signaling overhead, improve utilization of network resources, and/or the like. A QCL relationship may be specified based at least in part on a transmission control indicator (TCI) state.

However, when operating in, for example, an HST-SFN deployment, the UE may be subject to different conditions for different beams with different remote radio heads (RRHs) of different TRPs. In other words, the UE may experience a first Doppler shift for communication with a first RRH at a first position and a second Doppler shift for communication with a second RRH at a second position. When the UE estimates a carrier frequency, the UE may transmit using the carrier frequency to the first RRH and the second RRH. However, the first RRH and the second RRH may be unable to estimate a Doppler shift pre-compensation value used by the UE. This may result in dropped communication, interference, and/or the like.

Some aspects described herein provide enhancements for Doppler shift compensation. For example, a UE transmit an indication of a UE capability for uplink frequency shift configuration, receive QCL information associated with a TCI state, determine an uplink frequency shift configuration for a sounding reference signal (SRS) based at least in part on the QCL information and the TCI state, and may transmit the SRS in accordance with the uplink frequency shift configuration. In this case, based at least in part on using the QCL information and TCI state for determining the uplink frequency shift configuration, the UE enables estimation of a Doppler shift pre-compensation value for each TRP with which the UE is communicating. In this way, the UE reduces a likelihood of dropped communications, interference, and/or the like.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with a 5G or NR radio access technologies (RAT), aspects of the present disclosure can be applied to other RATS, such as a 3G RAT, a 4G RAT, and/or a RAT subsequent to 5G (e.g., 6G).

FIG. 1 is a diagram illustrating an example of a wireless network 100, in accordance with various aspects of the present disclosure. The wireless network 100 may be or may include elements of a 5G (NR) network, an LTE network, and/or the like. The wireless network 100 may include a number of base stations 110 (shown as BS 110a, BS 110b, BS 110c, and BS 110d) and other network entities. A base station (BS) is an entity that communicates with user equipment (UEs) and may also be referred to as an NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110d may communicate with macro BS 110a and a UE 120d in order to facilitate communication between BS 110a and UE 120d. A relay station may also be referred to as a relay BS, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 watts) whereas pico BSs, femto BSs, and relay BSs may have lower transmit power levels (e.g., 0.1 to 2 watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a hand-held device, a laptop computer, a cordless phone, a wireless local loop (WLL) station, a tablet, a camera, a gaming device, a netbook, a smartbook, ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like. In some aspects, the processor components and the memory components may be coupled together. For example, the processor components (e.g., one or more processors) and the memory components (e.g., a memory) may be operatively coupled, communicatively coupled, electronically coupled, electrically coupled, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

Devices of wireless network 100 may communicate using the electromagnetic spectrum, which may be subdivided based on frequency or wavelength into various classes, bands, channels, and/or the like. For example, devices of wireless network 100 may communicate using an operating band having a first frequency range (FR1), which may span from 410 MHz to 7.125 GHz, and/or may communicate using an operating band having a second frequency range (FR2), which may span from 24.25 GHz to 52.6 GHz. The frequencies between FR1 and FR2 are sometimes referred to as mid-band frequencies. Although a portion of FR1 is greater than 6 GHz, FR1 is often referred to as a "sub-6 GHz" band. Similarly, FR2 is often referred to as a "millimeter wave" band despite being different from the extremely high frequency (EHF) band (30 GHz-300 GHz) which is identified by the International Telecommunications Union (ITU) as a "millimeter wave" band. Thus, unless specifically stated otherwise, it should be understood that the term "sub-6 GHz" or the like, if used herein, may broadly represent frequencies less than 6 GHz, frequencies within FR1, and/or mid-band frequencies (e.g., greater than 7.125 GHz). Similarly, unless specifically stated otherwise, it should be understood that the term "millimeter wave" or the like, if used herein, may broadly represent frequencies within the EHF band, frequencies within FR2, and/or mid-band frequencies (e.g., less than 24.25 GHz). It is contemplated that the frequencies included in FR1 and FR2 may be modified, and techniques described herein are applicable to those modified frequency ranges.

As indicated above, FIG. 1 is provided as an example. Other examples may differ from what is described with regard to FIG. 1.

Figure 2:
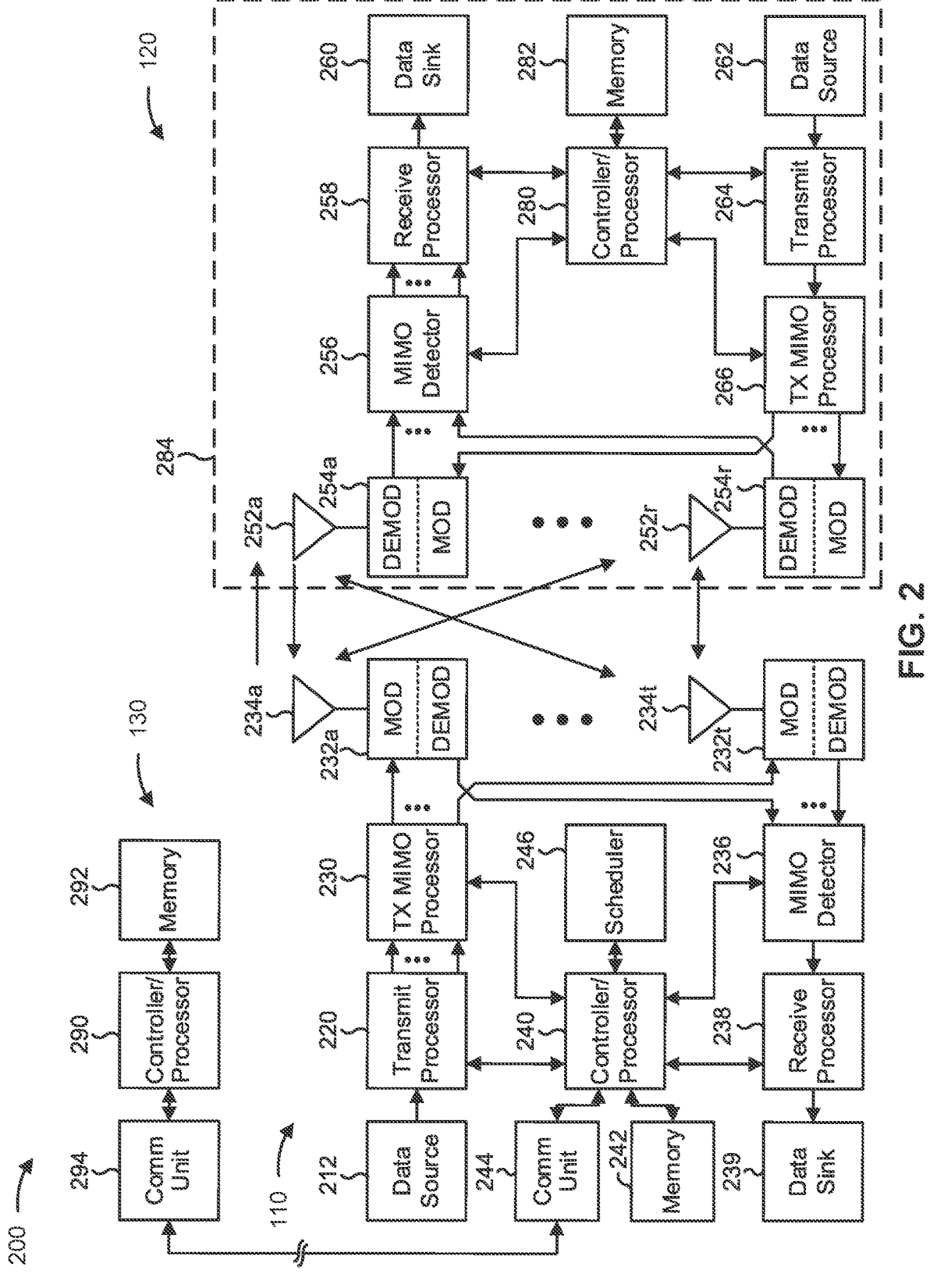
FIG. 2 is a diagram illustrating an example of a base station in communication with a LIE in a wireless network, in accordance with various aspects of the present disclosure.

FIG. 2 is a diagram illustrating an example 200 of a base station 110 in communication with a UE 120 in a wireless network 100, in accordance with various aspects of the present disclosure. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., a cell-specific reference signal (CRS), a demodulation reference signal (DMRS), and/or the like) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. The term "controller/processor" may refer to one or more controllers, one or more processors, or a combination thereof. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing 284.

Network controller 130 may include communication unit 294, controller/processor 290, and memory 292. Network controller 130 may include, for example, one or more devices in a core network. Network controller 130 may communicate with base station 110 via communication unit 294.

On the uplink, at UE 120, a transmit processor 264 may receive and process data from a data source 262 and control information (e.g., for reports that include RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. In some aspects, the UE 120 includes a transceiver. The transceiver may include any combination of antenna(s) 252, modulators and/or demodulators 254, MIMO detector 256, receive processor 258, transmit processor 264, and/or TX MIMO processor 266. The transceiver may be used by a processor (e.g., controller/processor 280) and memory 282 to perform aspects of any of the methods described herein, for example, as described with reference to FIGS. 3A-7.

At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Base station 110 may include a scheduler 246 to schedule UEs 120 for downlink and/or uplink communications. In some aspects, the base station 110 includes a transceiver. The transceiver may include any combination of antenna(s) 234, modulators and/or demodulators 232, MIMO detector 236, receive processor 238, transmit processor 220, and/or TX MIMO processor 230. The transceiver may be used by a processor (e.g., controller/processor 240) and memory 242 to perform aspects of any of the methods described herein, for example, as described with reference to FIGS. 3A-7.

Controller/processor 240 of base station 110, controller/processor 280 of UE 120, and/or any other component(s) of FIG. 2 may perform one or more techniques associated with Doppler pre-compensation indication, as described in more detail elsewhere herein. For example, controller/processor 240 of base station 110, controller/processor 280 of UE 120, and/or any other component(s) of FIG. 2 may perform or direct operations of, for example, process 700 of FIG. 7 and/or other processes as described herein. Memories 242 and 282 may store data and program codes for base station 110 and UE 120, respectively. In some aspects, memory 242 and/or memory 282 may include a non-transitory computer-readable medium storing one or more instructions (e.g., code, program code, and/or the like) for wireless communication. For example, the one or more instructions, when executed (e.g., directly, or after compiling, converting, interpreting, and/or the like) by one or more processors of the base station 110 and/or the UE 120, may cause the one or more processors, the UE 120, and/or the base station 110 to perform or direct operations of, for example, process 700 of FIG. 7 and/or other processes as described herein. In some aspects, executing instructions may include running the instructions, converting the instructions, compiling the instructions, interpreting the instructions, and/or the like.

In some aspects, UE 120 may include means for receiving, based at least in part on transmitting information indicating a UE capability for uplink frequency shift configuration, quasi-co-location (QCL) information associated with an uplink transmission control indicator (TCI) state, means for determining an uplink frequency shift configuration for a sounding reference signal (SRS) based at least in part on the QCL information associated with the uplink TCI state, means for transmitting the SRS based at least in part on the uplink frequency shift configuration, and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of controller/processor 280.

As indicated above, FIG. 2 is provided as an example. Other examples may differ from what is described with regard to FIG. 2.

A UE may use quasi co-location (QCL) relationships between different reference signal ports to enable channel estimation, frequency offset estimation, synchronization, and/or the like. For example, when a pair of antenna ports are quasi co-located with respect to a delay spread, the UE may use a delay spread determined for a first antenna port when using a second antenna port. Based at least in part on using QCL relationships, a UE may receive a physical downlink shared channel (PDSCH), a physical downlink control channel (PDCCH), a channel state information reference signal (CSI-RS), and/or the like. For example, a BS may indicate that an antenna port used for a synchronization signal block (SSB) communication or a CSI-RS communication is quasi co-located with an antenna port used for a PDCCH, a PDSCH, a CR-RS, and/or the like. QCL relationships may be defined according to a set of types. In QCL Type-A, antenna ports may share a Doppler shift, a Doppler spread, an average delay, and a delay spread. In QCL Type-B, antenna ports may share a Doppler shift and a Doppler spread. In QCL Type-C, antenna ports may share a Doppler shift and an average delay. In QCL Type-D antenna ports may share spatial receiver parameters.

Similarly, the BS may use radio resource control (RRC) configuration to identify a set of transmission control indicator (TCI) states for a PDSCH, a set of TCI states for a PDCCH, and/or the like. In this case, after identifying the set of TCI states for a channel, the BS may indicate which TCI state is active using, for example, a medium access control (MAC) control element (CE) or a downlink control information transmission. Each TCI state defines a set of parameters for configuring a QCL relationship between a set of downlink reference signals and one or more ports, such as a set of demodulation reference signal (DMRS) ports of a PDSCH, a DMRS port of a PDCCH, a CSI-RS port of a CSI-RS resource, and/or the like. The set of downlink reference signals, for which the TCI state defines the QCL relationship, may include an SSB or a CSI-RS. In some cases, a TCI state may have a pair of QCL relationships configured, such as a TCI state indicating a first QCL relationship for a first downlink reference signal and a second QCL relationship for a second downlink reference signal.

QCL relationships may be extended to uplink communications using uplink TCI states. For example, an uplink TCI state may include a source reference signal that indicates an uplink transmission beam for a target uplink reference signal and/or channel. In this case, the source reference signal may include a sounding reference signal (SRS), an SSB, a CSI-RS, and/or the like and the target uplink reference signal or channel may include a physical uplink control channel (PUCCH), an SRS, a physical random access channel (PRACH), a physical uplink shared channel (PUSCH), and/or the like. Uplink TCI states may be classified according to a type (e.g., Type-1, Type-2, etc.), which may be defined by the source reference signal, the target uplink reference signal, and the associated QCL relationship.

Figures 3A, 3B:
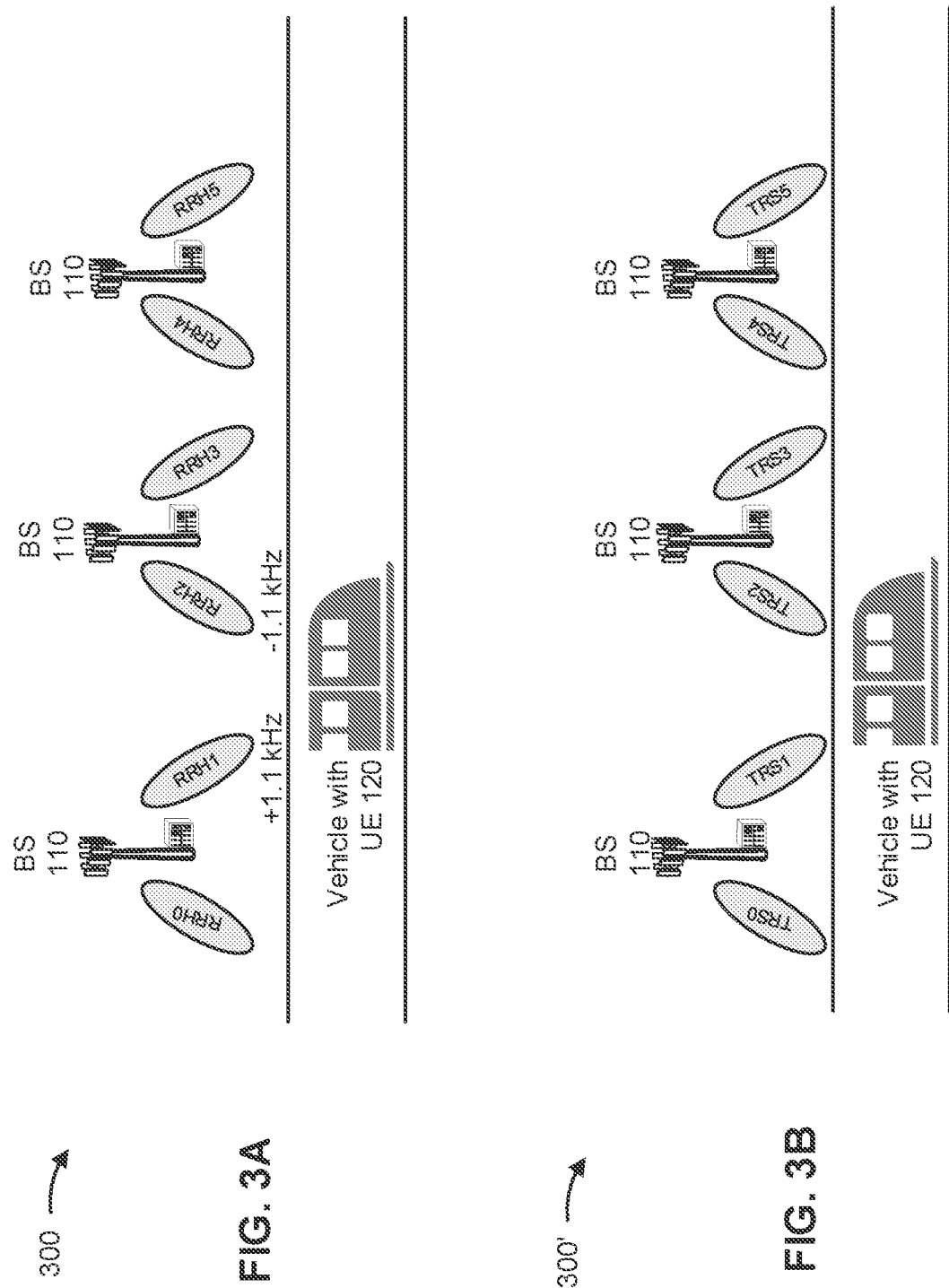
FIGS. 3A and 3B are diagrams illustrating an example of communication in a Doppler shift scenario, in accordance with various aspects of the present disclosure.

FIGS. 3A and 3B are diagrams illustrating an examples 300/300' associated with communication in a Doppler shift scenario, in accordance with various aspects of the present disclosure. As shown in FIGS. 3A and 3B, examples 300/300' include a UE 120 and a set of BSs 110, such as in an HST-SFN deployment (e.g., UE 120 may be a communication component of the train or a UE being operated on the train).

As shown in FIGS. 3A and 3B, a set of BSs 110 may be a set of transmit receive points (TRPs) associated with a plurality of remote radio heads (RRHs). In this case, the TRPs may coordinate to transmit one or more tracking reference signals (TRSs), PDSCHs, and/or the like. In this case, as shown, a Doppler shift experienced by UE 120 from RRH1 may be +1.1 kilohertz (kHz) and a Doppler shift experienced by UE 120 from RRH2 may be −1.1 kHz. UE 120 may modulate a carrier frequency of an uplink signal based at least in part on a carrier frequency of a received downlink signal. For example, UE 120 may modulate an uplink signal based at least in part on a carrier frequency of the TRSs or PDSCHs. However, the carrier frequency that UE 120 measures for the TRSs or PDSCHs may be associated with two different Doppler shifts, as shown. This may prevent UE 120 and the BSs 110 from communicating to enable Doppler shift pre-compensation for each TRP and associated RRH. Some aspects described herein may enable the UE to modulate, for example, the carrier frequency of an uplink signal based at least in part on the carrier frequency of a TRS from only a signal TRP, which may enable BSs 110 to determine Doppler shift pre-compensation values for each TRP and associated RRH.

As indicated above, FIGS. 3A and 3B are provided as examples. Other examples may differ from what is described with respect to FIGS. 3A and 3B.

Figure 4:
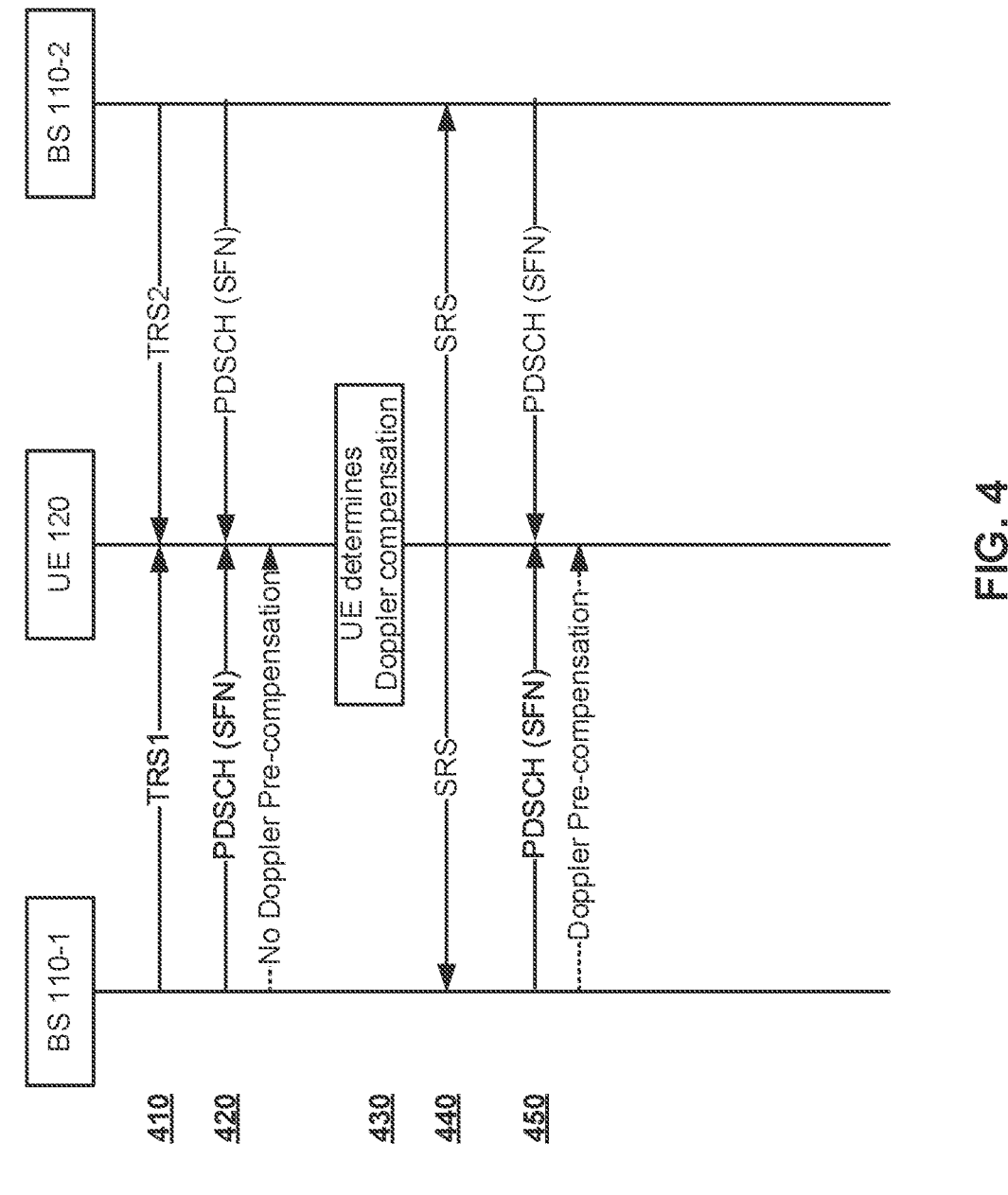
FIG. 4 is a diagram illustrating an example associated with Doppler shift compensation, in accordance with various aspects of the present disclosure.
Figure 5A:
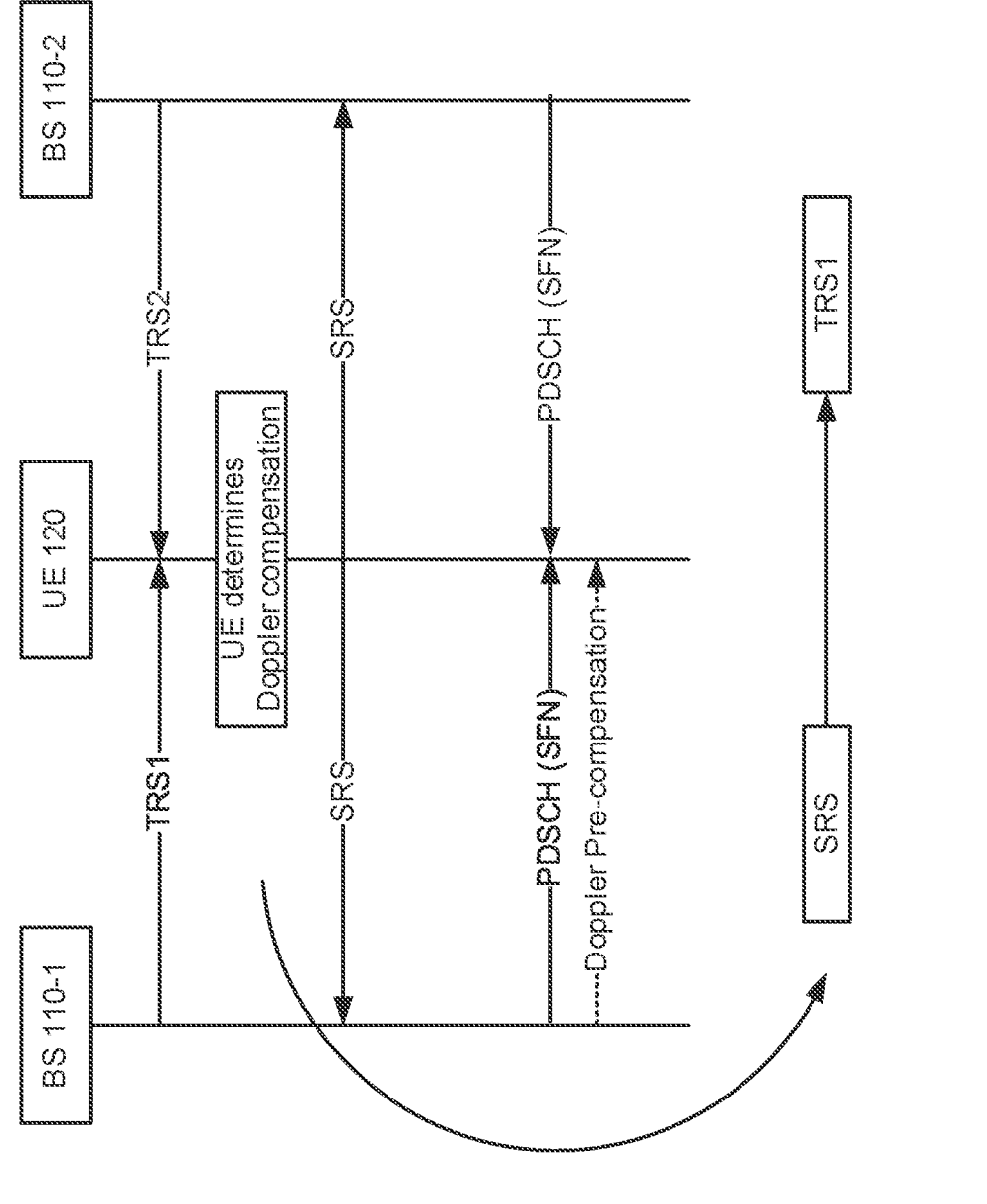
FIGS. 5A and 5B are diagrams illustrating examples associated with Doppler shift compensation, in accordance with various aspects of the present disclosure.
Figure 5B:
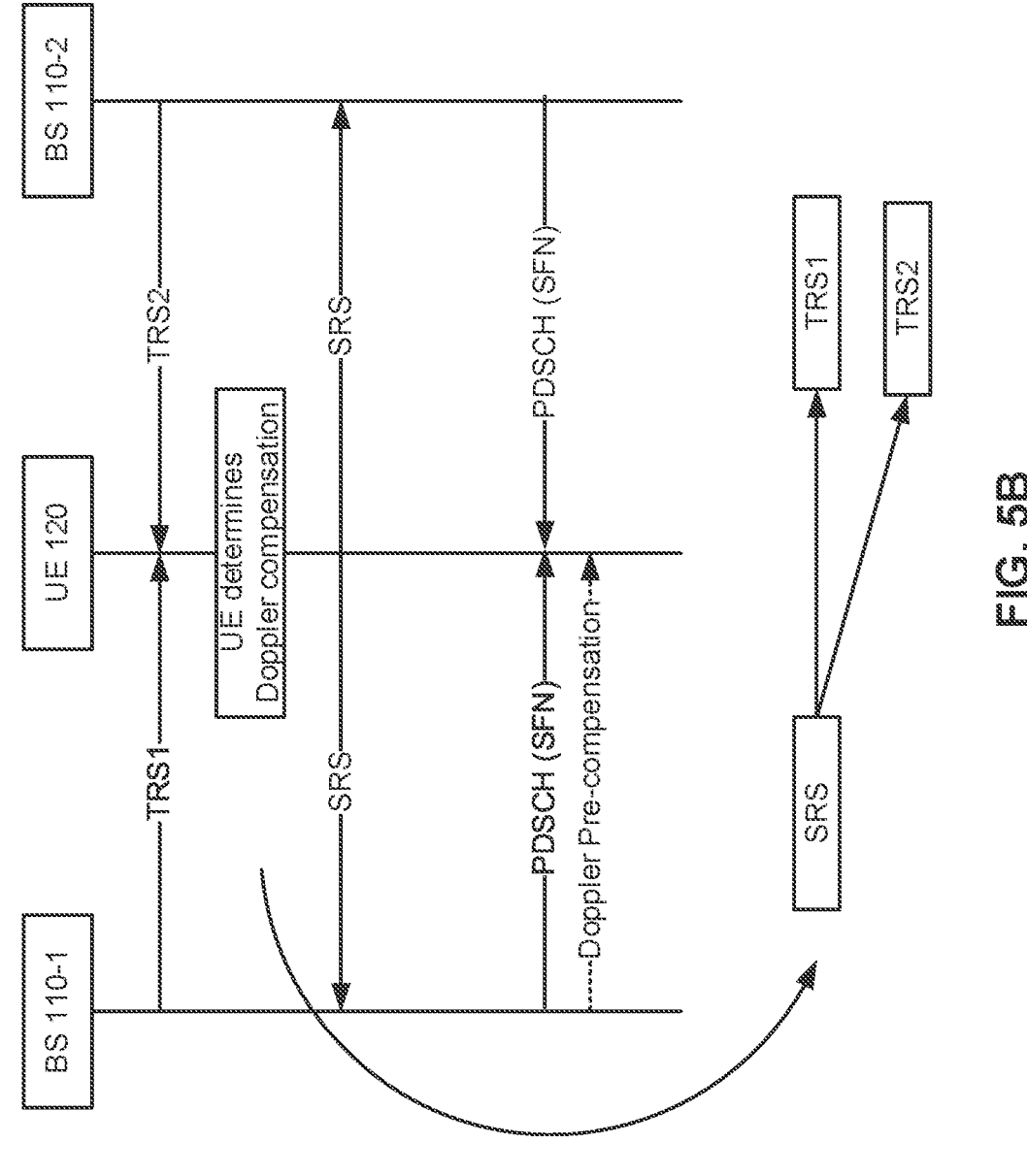

FIG. 4 is a diagram illustrating an example 400 associated with Doppler shift compensation, in accordance with various aspects of the present disclosure. As shown in FIG. 4, example 400 include a UE 120 and a set of BSs 110. FIGS. 5A and 5B are diagrams illustrating an examples 500/500' associated with Doppler shift compensation, in accordance with various aspects of the present disclosure. As shown in FIGS. 5A and 5B, examples 500/500' include a UE 120 and a set of BSs 110.

As further shown in FIG. 4, and by reference numbers 410 and 420, UE 120 may receive respective TRSs and single frequency network (SFN) PDSCHs from a set of BSs 110. For example, UE 120 may receive a first TRS (TRS1) and first PDSCH from a first BS 110 and a second TRS (TRS2) and a second PDSCH from a second BS 110. In some aspects, UE 120 may receive a dynamic indication that a PDSCH is not subject to Doppler pre-compensation. In this case, as shown by reference number 430, UE 120 compensates for uplink clock oscillator (XO) error based at least in part on frequency offsets from the TRSs and/or the PDSCHs.

In some aspects, UE 120 may determine the XO error in accordance with a set of equations:

$$\tilde{f}_{UL} = f_{UL}(1 + \epsilon_{UE})$$

$$\epsilon_{UE} = \epsilon_{CFO} + \epsilon_{DopplerShift} + \epsilon_{noise}$$

$$\tilde{f}_{UL} = F_{UL}(1 - \epsilon)(1 + \epsilon_{UE})$$

$$\tilde{f}_{UL} \approx F_{UL}(1 + \epsilon_{UE} - \epsilon) = F_{UL} + F_{UL}(\epsilon_{UE} - \epsilon) \approx F_{UL} + F_{UL}\epsilon_{DopplerShift}$$

where f represents a UE uncorrected (XO-based) frequency, f̃ represents a UE corrected frequency using a frequency tracking loop (FTL), F represents a nominal frequency of an allocated channel frequency (e.g., an E-UTRA absolute radio frequency channel number (EARFCN)), $\epsilon$ represents an XO ppm error relative to the nominal frequency, $\epsilon_{UE}$ represents the error determined based at least in part on a downlink FTL loop based at least in part on a TRS and/or an SSB, $\epsilon_{DopplerShift}$ represents a Doppler shift component of the error, and $\epsilon_{Noise}$ represents a noise component of the error. In this case, a BS 110 may estimate a frequency offset from a transmitted SRS, as described below, based at least in part on an equation:

$$F_{UL}\epsilon_{DopplerShift} + F_{UL}\epsilon_{NW\_DopplerShift} = F_{UL}(\epsilon_{DopplerShift_{DL}} + \epsilon_{DopplerShift_{UL}})$$

which may enable BS 110 to successfully decode the transmitted SRS and/or an associated communication.

As further shown in FIG. 4, and by reference number 440, UE 120 may transmit SRSs on an uplink to the set of BSs 110. For example, UE 120 may transmit the SRSs and the set of BSs 110 may estimate a Doppler shift frequency offset based at least in part on the SRS. In some aspects, UE 120 may time division multiplex (TDM) the SRSs. For example, UE 120 may transmit the SRSs using two different SRS resources, using one SRS resource with a plurality of symbols, using a plurality of antenna panels, and/or the like. In some aspects, UE 120 may configure a set of uplink TCI states for the set of SRS resources. For example, UE 120 may configure a first uplink TCI state associated with TRS1 for the first SRS and a second uplink TCI state associated with TRS2 for the second SRS. Subsequently, as shown by reference number 450, UE 120 may receive further PDSCH transmissions for which Doppler pre-compensation applies.

In this case, a QCL relationship between the set of TRSs and the further PDSCH transmissions may change based at least in part on Doppler pre-compensation applying. However, in some cases, the Doppler shift may change between when UE 120 estimates the Doppler shift based at least in part on the TRSs and when UE 120 receives the pre-compensated further PDSCH transmissions. Further, there may be Doppler shift estimation errors at UE 120 and/or the set of BSs 110.

As shown in FIG. 5A, and by example 500, when the set of BSs 110 can communicate with each other in a backhaul network or when each RRH is an RRH of a single TRP, UE 120 may map an SRS to a single TRS as a source RS for a QCL relationship. In contrast, as shown in FIG. 5B, and by example 500', when the set of BSs 110 do not communicate via a backhaul and/or the RRHs are associated with different TRPs, UE 120 may map the SRS to each TRS. In this case, each TRP may separately estimate a Doppler shift from an uplink SRS and perform pre-compensation on a downlink.

As indicated above, FIG. 4 is provided as an example. Other examples may differ from what is described with respect to FIG. 4. As indicated above, FIGS. 5A and 5B are provided as examples. Other examples may differ from what is described with respect to FIGS. 5A and 5B.

Figure 6A:
FIGS. 6A-6E are diagrams illustrating examples associated with quasi-co-location relationships for Doppler shift compensation, in accordance with various aspects of the present disclosure.

FIGS. 6A-6E are diagrams illustrating an examples 600-680 associated with communication in a Doppler shift scenario, in accordance with various aspects of the present disclosure. As shown in FIG. 6A, example 600 includes a UE 120 and a set of BSs 110.

As further shown in FIG. 6A, and by reference number 605, UE 120 may provide UE capability information. For example, UE 120 may indicate that UE 120 is capable of Doppler shift modulation. In some aspects, UE 120 may indicate a capability for a single Doppler shift, a plurality of Doppler shifts, and/or the like, as described in more detail herein. In this case, BS 110 may provide configuration information identifying a TCI state, a QCL type, and/or the like based at least in part on receiving the UE capability information, as shown by reference number 610. For example, UE 120 may receive SRS resource set information associated with configuring an SRS resource set for SRS transmissions. In this case, UE 120 may receive the configuration information and may determine that uplink Doppler shift compensation is enabled based at least in part on receiving the configuration information.

In some aspects, UE 120 may receive spatial relationship information indicating a QCL source reference signal and a corresponding QCL relationship. In some aspects, UE 120 may receive a radio resource control (RRC) message including QCL information associated with determining uplink TCI states. For example, when UE 120 is using aperiodic SRS (A-SRS), UE 120 may receive a downlink control information (DCI) including information identifying an uplink TCI codepoint that indicates a TCI state index corresponding to a TCI state of a set of configured TCI states. Additionally, or alternatively, when UE 120 is using semi-persistent SRS (SP-SRS), UE 120 may receive a medium access control (MAC) control element (CE) identifying an uplink TCI codepoint that indicates the TCI state index from which to select an uplink TCI state for communication.

In some aspects, UE 120 may determine a mapping between a single or a plurality of Doppler shifts based at least in part on the identified uplink TCI states, QCL assumptions, and/or the like for an SRS. In this case, based at least in part on a QCL source reference signal, an indicated uplink TCI state, and/or the like, UE 120 may adjust or modulate an uplink signal and transmit one or more SRSs, as further shown in FIG. 6A and by reference numbers 615 and 620. For example, UE 120 may determine an uplink frequency shift configuration (e.g., which may include a shift to an uplink carrier center frequency) for an SRS based at least in part on an estimated Doppler shift. In this case, UE 120 may estimate the Doppler shift based at least in part on a downlink TRS that is the QCL source reference signal, a QCL relationship, the indicated uplink TCI state, and/or the like.

Figures 6B, 6C, 6D, 6E:
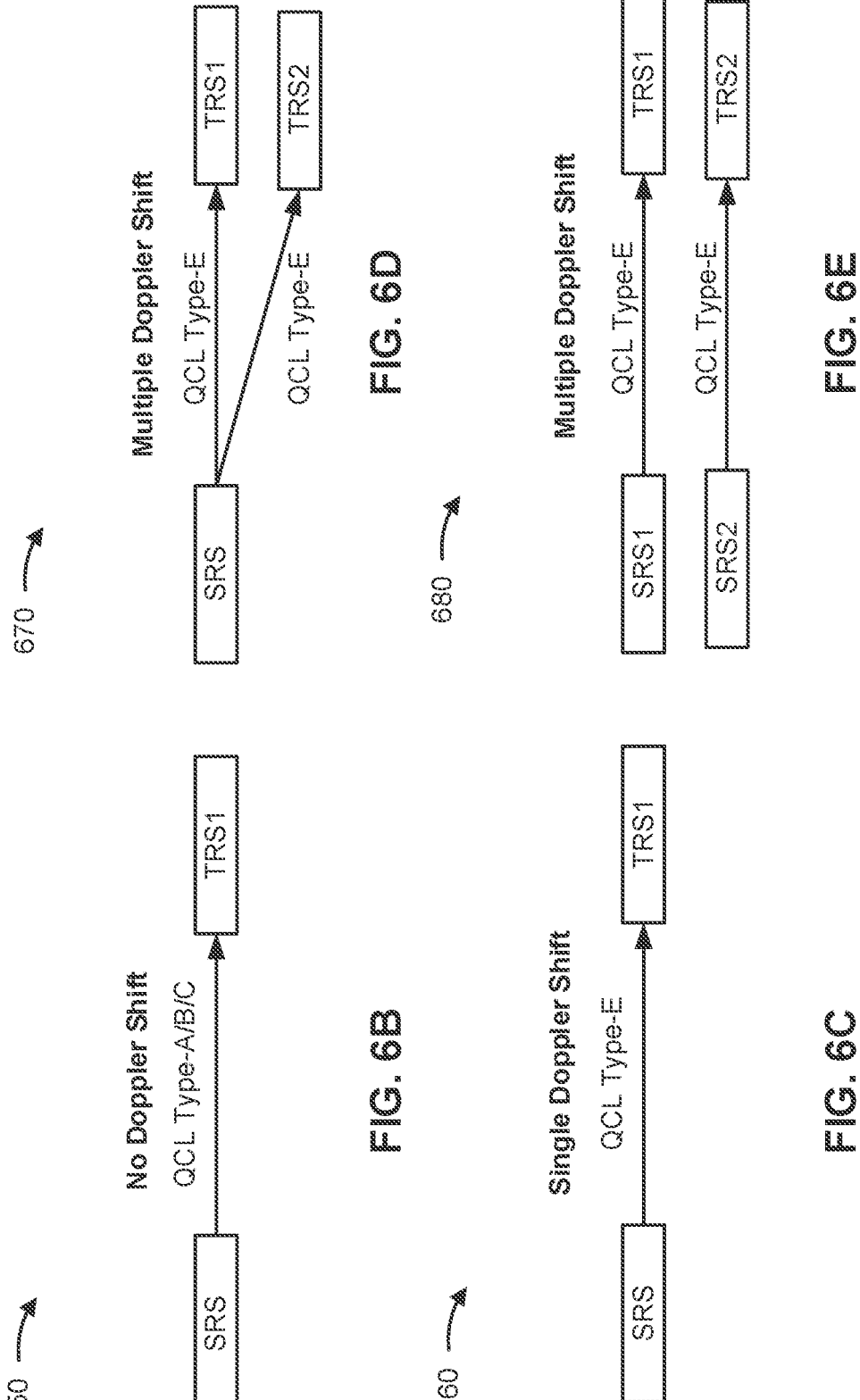

As an example, for QCL Type-A, -B, and -C, UE 120 may forgo Doppler shift modulation of an uplink signal (e.g., an SRS) based at least in part on the TRS and the SRS being quasi-co-located. In contrast, for a QCL Type-E, UE 120 may perform Doppler modulation based at least in part on a Doppler shift or a spread of the TRS and the SRS being different. As shown in FIG. 6B, and by example 650, for a QCL source reference signal of TRS1 and a QCL Type-A, -B, or -C, for the SRS, UE 120 may forgo performing a Doppler shift on a single SRS. In contrast, as shown in FIG. 6C, and by example 660, for a QCL source reference signal of TRS1 and a QCL Type-E, UE 120 may perform a single Doppler shift on a single SRS. Similarly, as shown in FIG. 6D, and by example 670, when UE 120 receives a plurality of TRSs as QCL source reference signals for a single SRS, UE 120 may perform multiple Doppler shifts on the single SRS. Similarly, as shown in FIG. 6E, and by example 680, when UE 120 receives a plurality of TRSs as QCL source reference signals for a corresponding plurality of SRSs, UE 120 may perform respective Doppler shifts on each SRS.

In some aspects, UE 120 may determine a plurality of QCL assumptions corresponding to a plurality of TCI states for a TRS of a TRP. For example, when UE 120 is configured with a single SRS resource set, based at least in part on receiving the SRS resource set information, as described above with regard to reference number 610, with a plurality of SRS resources, UE 120 may identify a plurality of uplink TCI states for the plurality of SRS resources. Additionally, or alternatively, when UE 120 has a plurality of panels, UE 120 may have a different SRS resource set for each panel and may have a TCI state corresponding to each SRS resource set or a set of TCI states corresponding to each SRS resource set. In some aspects, UE 120 may have a single SRS resource with a plurality of symbols. For example, UE 120 may have received SRS resource information identifying time division multiplexing (TDM) of an SRS resource with a first symbol and a second symbol. In this case, the first symbol and the second symbol may share a common QCL type. Additionally, or alternatively, UE 120 may have different QCL types for each symbol.

As indicated above, FIGS. 6A-6E are provided as examples. Other examples may differ from what is described with respect to FIGS. 6A-6E.

FIG. 7 is a diagram illustrating an example process 700 performed, for example, by a UE, in accordance with various aspects of the present disclosure. Example process 700 is an example where the UE (e.g., UE 120 and/or the like) performs operations associated with Doppler shift compensation.

As shown in FIG. 7, in some aspects, process 700 may include receiving, based at least in part on transmitting information indicating a UE capability for uplink frequency shift configuration, quasi-co-location (QCL) information associated with an uplink transmission control indicator (TCI) state (block 710). For example, the UE (e.g., using receive processor 258, transmit processor 264, controller/processor 280, memory 282, and/or the like) may receive, based at least in part on transmitting information indicating a UE capability for uplink frequency shift configuration, quasi-co-location (QCL) information associated with an uplink transmission control indicator (TCI) state, as described above.

As further shown in FIG. 7, in some aspects, process 700 may include determining an uplink frequency shift configuration for a sounding reference signal (SRS) based at least in part on the QCL information associated with the uplink TCI state (block 720). For example, the UE (e.g., using receive processor 258, transmit processor 264, controller/processor 280, memory 282, and/or the like) may determine an uplink frequency shift configuration for a sounding reference signal (SRS) based at least in part on the QCL information associated with the uplink TCI state, as described above.

As further shown in FIG. 7, in some aspects, process 700 may include transmitting the SRS based at least in part on the uplink frequency shift configuration (block 730). For example, the UE (e.g., using receive processor 258, transmit processor 264, controller/processor 280, memory 282, and/or the like) may transmit the SRS based at least in part on the uplink frequency shift configuration, as described above.

Process 700 may include additional aspects, such as any single aspect or any combination of aspects described below and/or in connection with one or more other processes described elsewhere herein.

In a first aspect, the uplink frequency shift configuration is based at least in part on a Doppler shift determined based at least in part on a downlink tracking reference signal that is a source reference signal of the QCL information or the uplink TCI state.

In a second aspect, alone or in combination with the first aspect, process 700 includes transmitting the information indicating the UE capability for uplink frequency shift configuration in connection with a downlink Doppler shift.

In a third aspect, alone or in combination with one or more of the first and second aspects, process 700 includes receiving a downlink shared channel message that is downlink Doppler shift pre-compensated in connection with the SRS.

In a fourth aspect, alone or in combination with one or more of the first through third aspects, is configured to map the SRS to a single received tracking reference signal for the uplink frequency shift configuration.

In a fifth aspect, alone or in combination with one or more of the first through fourth aspects, the UE is configured to map the SRS to a plurality of received tracking reference signal for the uplink frequency shift configuration.

In a sixth aspect, alone or in combination with one or more of the first through fifth aspects, the QCL information indicates at least one of QCL type-A, type-B, or type-C, and the uplink frequency shift configuration includes no Doppler shift modulation.

In a seventh aspect, alone or in combination with one or more of the first through sixth aspects, the QCL information indicates QCL type-E, and the uplink frequency shift configuration includes Doppler shift modulation.

In an eighth aspect, alone or in combination with one or more of the first through seventh aspects, the SRS is an aperiodic SRS and the uplink TCI state is based at least in part on an uplink TCI codepoint indicated in downlink control information.

In a ninth aspect, alone or in combination with one or more of the first through eighth aspects, the SRS is a semi-persistent SRS and the uplink TCI state is based at least in part on an uplink TCI codepoint indicated in a medium access control control element.

In a tenth aspect, alone or in combination with one or more of the first through ninth aspects, the SRS is a periodic SRS and the uplink TCI state is based at least in part on radio resource control (RRC) configuration.

In an eleventh aspect, alone or in combination with one or more of the first through tenth aspects, the QCL information is based at least in part on a received channel state information reference signal.

In a twelfth aspect, alone or in combination with one or more of the first through eleventh aspects, the QCL information is configured on at least one of: a per transmit-receive-point basis, a per antenna panel basis, a per symbol basis, or a per symbol group basis.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A method of wireless communication performed by a user equipment (UE), comprising:

receiving, based at least in part on the UE transmitting information indicating a UE capability for Doppler shift modulation, quasi-co-location (QCL) information associated with an uplink transmission control indicator (TCI) state; and transmitting a sounding reference signal (SRS) with or without Doppler shift modulation based on the QCL information.

2. The method of claim 1, further comprising:

determining a Doppler shift based at least in part on a downlink reference signal that is a source reference signal of the QCL information or the uplink TCI state.

3. The method of claim 1, further comprising:

transmitting the information indicating the UE capability for Doppler shift modulation in connection with a downlink Doppler shift.

4. The method of claim 1, further comprising:

receiving a downlink shared channel message that is downlink Doppler shift pre-compensated in connection with the SRS.

5. The method of claim 1, wherein the UE is configured to map the SRS to a single received tracking reference signal.

6. The method of claim 1, wherein the UE is configured to map the SRS to a plurality of received tracking reference signals.

7. The method of claim 1, wherein the QCL information indicates at least one of QCL type-A, type-B, or type-C; and wherein transmitting the SRS with or without Doppler shift modulation based on the QCL information comprises transmitting the SRS without the Doppler shift modulation.

8. The method of claim 1, wherein the QCL information indicates QCL not associated with a Doppler shift or spread; and wherein transmitting the SRS with or without Doppler shift modulation based on the QCL information comprises transmitting the SRS with the Doppler shift modulation.

9. The method of claim 1, wherein the SRS is an aperiodic SRS and the uplink TCI state is based at least in part on an uplink TCI codepoint indicated in downlink control information.

10. The method of claim 1, wherein the SRS is a semi-persistent SRS and the uplink TCI state is based at least in part on an uplink TCI codepoint indicated in a medium access control control element.

11. The method of claim 1, wherein the SRS is a periodic SRS and the uplink TCI state is based at least in part on radio resource control (RRC) configuration.

12. The method of claim 1, wherein the QCL information is based at least in part on a received channel state information reference signal.

13. The method of claim 1, wherein the QCL information is configured on a per transmit-receive-point basis.

14. The method of claim 1, wherein the QCL information is configured on a per antenna panel basis.

15. The method of claim 1, wherein the QCL information is configured on a per symbol basis.

16. The method of claim 1, wherein the QCL information is configured on a per symbol group basis.

17. A user equipment (UE) for wireless communication, comprising:
  memory; and
  a transceiver; and
  one or more processors coupled to the memory, the one or more processors configured to:
    receive, via the transceiver and based at least in part on the UE transmitting information indicating a UE capability for Doppler shift modulation, quasi-co-location (QCL) information associated with an uplink transmission control indicator (TCI) state; and
    transmit, via the transceiver, a sounding reference signal (SRS) with or without Doppler shift modulation based on the QCL information.

18. The UE of claim 17, wherein the one or more processors are further configured to:
  determine a Doppler shift based at least in part on a downlink reference signal that is a source reference signal of the QCL information or the uplink TCI state.

19. The UE of claim 17, wherein the one or more processors are further configured to:
  transmit, via the transceiver, the information indicating the UE capability for Doppler shift modulation in connection with a downlink Doppler shift.

20. The UE of claim 17, wherein the one or more processors are further configured to:
  receive, via the transceiver, a downlink shared channel message that is downlink Doppler shift pre-compensated in connection with the SRS.

21. The UE of claim 17, wherein the one or more processors are further configured to:
  map the SRS to a single received tracking reference signal.

22. The UE of claim 17, wherein the one or more processors are further configured to:
  map the SRS to a plurality of received tracking reference signals.

23. The UE of claim 17, wherein the QCL information indicates at least one of QCL type-A, type-B, or type-C; and
  wherein the one or more processors configured to transmit the SRS with or without Doppler shift modulation based on the QCL information comprises the UE configured to transmit the SRS without Doppler shift modulation.

24. The UE of claim 17, wherein the QCL information indicates QCL not associated with a Doppler shift or spread; and
  wherein the one or more processors configured to transmit the SRS with or without Doppler shift modulation based on the QCL information comprises the UE configured to transmit the SRS with Doppler shift modulation.

25. The UE of claim 17, wherein the SRS is an aperiodic SRS and the uplink TCI state is based at least in part on an uplink TCI codepoint indicated in downlink control information.

26. The UE of claim 17, wherein the SRS is a semi-persistent SRS and the uplink TCI state is based at least in part on an uplink TCI codepoint indicated in a medium access control control element.

27. The UE of claim 17, wherein the SRS is a periodic SRS and the uplink TCI state is based at least in part on radio resource control (RRC) configuration.

28. The UE of claim 17, wherein the QCL information is based at least in part on a received channel state information reference signal.

29. The UE of claim 17, wherein the QCL information is configured on at least one of: a per transmit-receive-point basis, a per antenna panel basis, a per symbol basis, or a per symbol group basis.

30. A non-transitory computer-readable medium storing one or more instructions for wireless communication, the one or more instructions comprising:
  one or more instructions that, when executed by one or more processors of a user equipment (UE), instruct the one or more processors to:
    receive, based at least in part on the UE transmitting information indicating a UE capability for Doppler shift modulation, quasi-co-location (QCL) information associated with an uplink transmission control indicator (TCI) state; and
    transmit a sounding reference signal (SRS) with or without Doppler shift modulation based on the QCL information.

31. The non-transitory computer-readable medium of claim 30, wherein the one or more instructions, when executed by the one or more processors, further instruct the one or more processors to determine a Doppler shift based at least in part on a downlink tracking reference signal that is a source reference signal of the QCL information or the uplink TCI state.

32. The non-transitory computer-readable medium of claim 30, wherein the one or more instructions, when executed by the one or more processors, further instruct the one or more processors to:
  transmit the information indicating the UE capability for Doppler shift modulation in connection with a downlink Doppler shift.

33. The non-transitory computer-readable medium of claim 30, wherein the QCL information is configured on at least one of: a per transmit-receive-point basis, a per antenna panel basis, a per symbol basis, or a per symbol group basis.

34. An apparatus for wireless communication, comprising:
  means for receiving, based at least in part on the apparatus transmitting information indicating a capability for Doppler shift modulation, quasi-co-location (QCL) information associated with an uplink transmission control indicator (TCI) state; and
  means for transmitting a sounding reference signal (SRS) with or without Doppler shift modulation based on the QCL information.

35. The apparatus of claim 34, further comprising means for determining a Doppler shift based at least in part on a downlink reference signal that is a source reference signal of the QCL information or the uplink TCI state.

* * * * *